(12) United States Patent　(10) Patent No.: US 7,486,452 B2
Kinoshita et al.　(45) Date of Patent: Feb. 3, 2009

(54) OPTICAL PICKUP FOR USE IN OPTICAL DISK DEVICE AND METHOD OF MANUFACTURING THE SAME

(75) Inventors: Yasushi Kinoshita, Hitachinaka (JP); Hidenao Saito, Yokohama (JP); Akio Yabe, Fujisawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 11/862,228

(22) Filed: Sep. 27, 2007

(65) Prior Publication Data

US 2008/0151397 A1　Jun. 26, 2008

(30) Foreign Application Priority Data

Dec. 20, 2006　(JP)　............................. 2006-342057

(51) Int. Cl.
*G02B 7/02*　(2006.01)
*G11B 7/00*　(2006.01)

(52) U.S. Cl. ...................... 359/813; 359/824; 369/44.14

(58) Field of Classification Search ......... 359/694–813, 359/819–824; 369/44.14–44.16
See application file for complete search history.

(56) References Cited

U.S. PATENT DOCUMENTS 7,095,574 B2 *　8/2006　Koga et al. ................... 359/813
7,199,949 B2 *　4/2007　Haruguchi et al. ............ 359/814
7,221,523 B2 *　5/2007　Miyagi ......................... 359/819

FOREIGN PATENT DOCUMENTS

JP　60-11536　3/1985
JP　2001-330027　11/2001
JP　2006-155839　6/2006

* cited by examiner

*Primary Examiner*—Mohammed Hasan
(74) *Attorney, Agent, or Firm*—Antonelli, Terry, Stout & Kraus, LLP.

(57) ABSTRACT

In an optical pickup, it is configured such that a first and a second thrust bearings of a motor rotation shaft, a lens holder to be moved in a thrust direction by the motor rotation shaft, and a preload unit which exerts preload of the thrust direction on the lens holder are included, and the second thrust bearing can adjust a position in the thrust direction. In addition, the first and second thrust bearings and the motor rotation shaft are made of conductor, and the optical pickup is manufactured by including the processes of: moving the second thrust bearing in a direction approaching to the motor rotation shaft till electrical continuity between the first thrust bearing and the second thrust bearing is obtained using an electrical continuity checker; subsequently moving the second thrust bearing in a direction departing from the motor rotation shaft; and subsequently fixing the second thrust bearing to the base.

4 Claims, 2 Drawing Sheets

OPTICAL PICKUP FOR USE IN OPTICAL DISK DEVICE AND METHOD OF MANUFACTURING THE SAME

BACKGROUND OF THE INVENTION

1. Field of the Invention

The present invention relates to an optical pickup for use in an optical disk device which records information on a recording surface of an optical disk and/or reproduces information recorded thereon.

2. Description of the Related Art

As correction means of spherical aberration for an optical disk, there is known means for correcting spherical aberration by moving a lens in an optical axis direction.

For example, Japanese Patent Application Laid-Open No. 2006-155839 discloses a configuration in which motor's rotating motion is converted into linear motion in a thrust direction and both a lens holder which abuts on a nut and a lens which is supported by and fixed to a lens holder are moved in an optical axis direction, by a screw mechanism which is combined by a lead screw formed on a motor rotation shaft and a nut engaged with the lead screw. As described above, in the configuration which obtains linear motion in the thrust direction by the screw mechanism, a backlash of the motor rotation shaft in the thrust direction can make a cause of vibration. In Japanese Patent Application Laid-Open No. 2006-155839, preload is exerted by a coil spring to bring the lens holder into contact with the nut. The preload is exerted in the order corresponding to the nut, the lead screw engaged with the nut, and the motor rotation shaft which fixes the lead screw, to bring the motor rotation shaft into contact with a thrust bearing provided at one end of the motor rotation shaft. As described above, there is the configuration that suppresses the backlash in the thrust direction by the preload.

FIG. 1 in Japanese Patent Application Publication No. 60-11536 discloses a configuration in which, in a mechanism that decelerates rotational speed of a motor rotation shaft by a worm gear, an adjustment screw is assembled at a tip end position of the motor rotation shaft; thrust adjustment is made by the adjustment screw; and then, the adjustment screw is fixed by the nut. In such configuration, an amount of movement of the motor rotation shaft in a thrust direction can be adjusted without exerting preload, and therefore, a backlash which makes a cause of vibration can be reduced.

In addition, Japanese Patent Application Laid-Open No. 2001-330027 discloses a configuration which can implement thrust adjustment at any time after assembling by providing display means for displaying an amount of movement of an adjustment screw in an axial direction of a rotation shaft.

In the thus configured optical pickup, there is a case that, after the nut and the lens holder abut on a stopper provided to control the movement in the thrust direction and stop, the nut and the lens holder will not move even if driven in a reverse direction. This is caused by that, when the nut and the lens holder stop by the stopper, the motor rotation shaft moves in the thrust direction by a reaction force from the stopper and a rotor mounted to the motor rotation shaft come in contact with a side surface in a motor case due to the movement, and consequently, a large frictional force is generated.

With respect to the above problems, in a configuration disclosed in Japanese Patent Application Laid-Open No. 2006-155839, it is possible to avoid that the motor rotor comes in contact with the side surface in the motor case, by increasing the preload of the coil spring to resist the reaction force from the stopper and to suppress the movement of the motor rotation shaft in the thrust direction. However, the preload of the coil spring continues to exert on each part during usual operation when reaction force from the stopper is not generated, and therefore, there is a possibility that movement in a reverse direction against the preload becomes difficult and there arise problems such as an increase in slide load and mechanical wear in a slide member such as a thrust bearing.

Meanwhile, Japanese Patent Application Publication No. 60-11536 and Japanese Patent Application Laid-Open No. 2001-330027 disclose the configuration in which the amount of movement of the motor rotation shaft in the thrust direction is adjusted by clamping the adjustment screw and contact between the motor rotor and the side surface in the motor case can be avoided. However, when the amount of movement of the motor rotation shaft in the thrust direction is set to zero, both ends of the motor rotation shaft come in contact with the adjustment screw and a thrust bearing while exerting a force thereon, and therefore, a slide resistance is generated. When a temperature rise is generated in such contact conditions, the amount of movement in the thrust direction due to an expansion of the motor rotation shaft is narrowed, and therefore, a further large slide resistance is generated. The increase in slide resistance becomes a load to the motor and leads to a lowering in output torque. On the contrary, when the amount of movement in the thrust direction is secured in order to decrease the slide resistance, the preload means is not provided in this configuration, and therefore, vibration in the thrust direction is generated. In this configuration, the amount of movement in the thrust direction needs to be strictly controlled in order to balance the reduction in slide resistance and the reduction in vibration level, and therefore, there is a possibility of a hindrance to improving production efficiency.

SUMMARY OF THE INVENTION

The present invention has been made to avoid contact between a motor rotor and a side surface in a motor case, and an object of the present invention is to provide an optical pickup in which a function that adjusts an amount of movement of a motor rotation shaft in a thrust direction is added to an optical pickup which had been enough by the configuration disclosed in Japanese Patent Application Laid-Open No. 2006-155839, and accordingly, a nut and a lens holder which stopped due to contact with a stopper are surely driven in a reverse direction and reliability is improved.

As means for solving the above problem, the present invention is configured such that, in an optical pickup which includes: a motor having a rotation shaft; a first thrust bearing at one end of the motor rotation shaft; a second thrust bearing at the other end of the motor rotation shaft; a base which fixes a motor case of the motor; a lead screw fitted to the motor rotation shaft; a screw mechanism which converts rotation of the lead screw into linear motion; a lens holder to be moved in a thrust direction by the screw mechanism; a lens to be held by the lens holder; and preload means for exerting preload of the thrust direction on the lens holder, the second thrust bearing can adjust a position in the thrust direction.

In addition, a first thrust bearing, a second thrust bearing, and a motor rotation shaft are made of conductor; and an optical pickup is manufactured by including the processes of: moving the second thrust bearing in a direction approaching to the motor rotation shaft till electrical continuity between the first thrust bearing and the second thrust bearing is obtained using an electrical continuity checker; subsequently moving the second thrust bearing in a direction departing from the motor rotation shaft; and subsequently fixing the second thrust bearing to the base.

Further, an optical pickup is manufactured by including the processes of: inserting a spacer made of conductor between the motor rotation shaft and the first thrust bearing, or between the motor rotation shaft and the second thrust bearing; moving the second thrust bearing in a direction approaching to the motor rotation shaft till electrical continuity between the first thrust bearing and the second thrust bearing is obtained using an electrical continuity checker; subsequently removing the spacer; and fixing the second thrust bearing to the base.

DETAILED DESCRIPTION OF PREFERRED EMBODIMENTS

First Embodiment

An optical pickup according to a first embodiment of the present invention will be described with reference to FIGS. 1 to 3.

Figure 1:
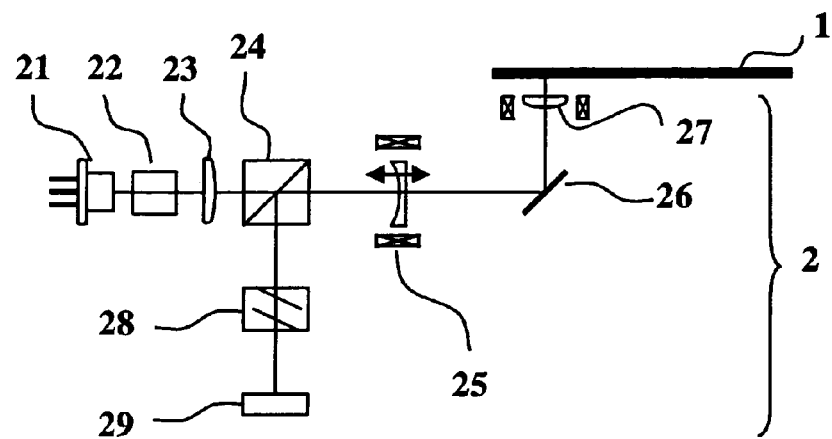
FIG. 1 is a view showing a configuration of an optical pickup according to a first embodiment of the present invention.

FIG. 1 is a view showing a configuration of the optical pickup according to the first embodiment of the present invention.

In FIG. 1, reference numeral 1 denotes an optical disk, 2 denotes an optical pickup, 21 denotes a laser light source, 22 denotes a shaping lens, 23 denotes a coupling lens, 24 denotes a beam splitter, 25 denotes spherical aberration correction means, 26 denotes a reflecting mirror, 27 denotes an object lens, 28 denotes a detector lens, and 29 denotes a photo-detector.

The optical pickup 2 mounts the laser light source 21, the shaping lens 22, the coupling lens 23, the beam splitter 24, the spherical aberration correction means 25, the reflecting mirror 26, the object lens 27, the detector lens 28, and the photo-detector 29 in one case; and constitutes an optical system which performs recording and reproducing of information on and from the optical disk 1. FIG. 1 shows the optical pickup 2 comprising one optical system, however, a plurality of optical systems may be mounted in one case in order to accommodate a plurality of standards on optical disk 1. In this case, a configuration can be made such that a component is shared in different optical systems. The laser light source 21 is a laser diode which oscillates and emits laser light having a specific wavelength corresponding to CD, DVD, BD, or HD-DVD. The shaping lens 22, the coupling lens 23, the beam splitter 24, the reflecting mirror 26, the object lens 27, and the detector lens 28 are optical lens or an optical mirror made of glass or transparent plastic. Functionality coating is applied to a lens surface and a reflection surface if required. The spherical aberration correction means 25 is formed by an optical lens made of glass or transparent plastic and a mechanism which moves the optical lens in an optical axis direction of the lens.

The optical lens which constitutes the spherical aberration correction means 25 may be of a two lenses configuration by adding one fixed lens. The photo-detector 29 is a semiconductor device which generates a voltage corresponding to light intensity irradiating a photo detection surface.

Laser light emitted from the laser light source 21 is made incident on the shaping lens 22 first. The shaping lens 22 is a lens which shapes laser light having an oval cross section, emitted from the laser light source 21, to substantially a circular cross section. A curved surface is formed on a laser light incident surface and a laser light emitting surface of the shaping lens 22. Next, laser light emitted from the shaping lens 22 is made incident on the coupling lens 23. The coupling lens 23 has a function which converts the laser light diverged and emitted from the laser light source 21 into parallel light. The laser light converted into the parallel light is transmissive through the beam splitter 24 and reaches the spherical aberration correction means 25. The spherical aberration correction means 25 has a driving mechanism of the lens and has a function which adjusts the laser light that has passed through the lens to weak divergent or weak convergent light by moving the lens in the optical axis direction. Further, the laser light is made incident on the object lens 27 via the reflecting mirror 26 and is collected on a recording surface of the optical disk 1 by the object lens 27 to form a beam spot. The optical pickup 2 performs recording and reproducing of information by the beam spot. In recording, on/off operation of the laser light source 21 is performed on the basis of recording information, and a recording pit is formed on the optical disk 1 by the beam spot to perform writing of information. In reproducing, laser light impinging upon the recording pit of the optical disk 1 and being reflected is picked up by the object lens 27, and the laser light is introduced onto the detection surface of the photo-detector 29 via the reflecting mirror 26, the spherical aberration correction means 25, the beam splitter 24, and the detector lens 28, in the order reverse to a forward route. The photo-detector 29 detects returned light from the optical disk 1 at an internal detection surface and performs reading of information. In addition, it is configured such that focus control and tracking control of the object lens 27, and lens position control of the spherical aberration correction means 25 are performed by processing a detection signal.

Figure 2:
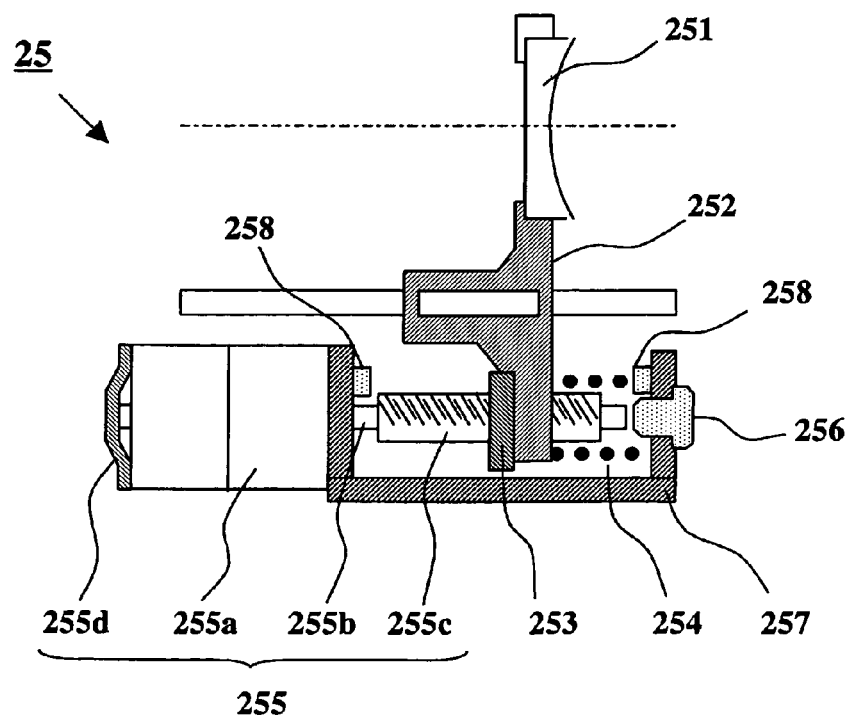
FIG. 2 is a view showing spherical aberration correction means of the optical pickup according to the first embodiment of the present invention.
Figure 3:
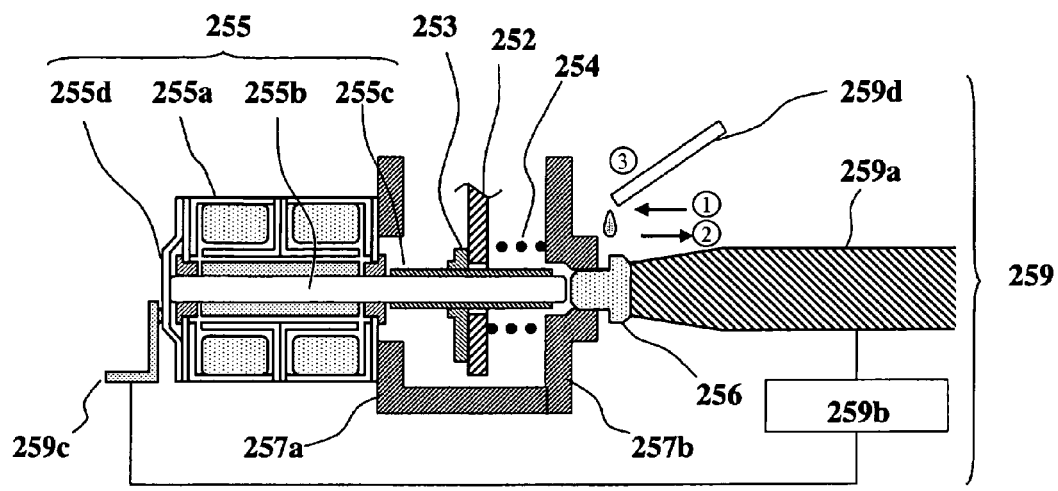
FIG. 3 is a view showing a method of manufacturing the spherical aberration correction means of the optical pickup according to the first embodiment of the present invention.

FIGS. 2 and 3 show a configuration and a manufacturing method of the spherical aberration correction means 25 mounted on the optical pickup 2 according to the first embodiment of the present invention.

In FIGS. 2 and 3, reference numeral 251 denotes a lens, 252 denotes a lens holder, 253 denotes a screw mechanism, 254 denotes preload means, 255 denotes a motor, 255a denotes a motor case, 255b denotes a rotation shaft, 255c denotes a lead screw, 255d denotes a first thrust bearing, 256 denotes a second thrust bearing, 257 denotes a base, 258 denotes a stopper, 259 denotes an assembly jig, 259a denotes a driver, 259b denotes an electrical continuity checker, 259c denotes a probe, and 259d denotes a bonding instrument. The spherical aberration correction means 25 is incorporated in the optical pickup 2 shown in FIG. 1.

The spherical aberration correction means 25 is of a configuration in which the base 257 is mounted with the lens 251, the lens holder 252, and the screw mechanism 253 that are driven units; the motor 255 that is a power driver; and the preload means 254, the second thrust bearing 256, and the stoppers 258 that are peripheral members. The lens 251 is an optical lens made of transparent resin such as polyolefin with high transmittance, or glass. Correction of the spherical aberration is implemented by diverging and converging the laser light incident on the lens 251 by moving the lens 251 in the optical axis direction. The lens holder 252 has an aperture to hold the lens 251, and the lens 251 is fixed by being fitted and adhered to the aperture. The lens holder 252 is suspended by a guiding shaft, and is configured so as to move in the optical axis direction of the lens 251 together with the lens 251. The screw mechanism 253 is a nut or a claw formed with a female screw on its inner periphery. In the case where the screw mechanism 253 is formed by a nut as shown in FIG. 2, the nut is rotated together with rotation of the lead screw 255c to be engaged therewith, and therefore, a rotation stop (not shown in the drawing) needs to be provided. The rotation stop can be realized by forming a projection or a groove on the nut and making the same abut on the lens holder 252 or an external member. In the case where the screw mechanism 253 is configured by a claw, it may be a configuration that a claw member is made and the same is fixed to the lens holder 252, or a configuration that the claw is directly formed on the lens holder 252. The preload means 254 is a member such as a spring which exerts preload of the optical axis direction on the lens holder 252. The motor 255 is a small size direct current motor or a stepping motor which can be mounted on the optical pickup 2. The lead screw 255c with grooves formed at a constant pitch on its outer periphery is formed on the output side of the rotation shaft 255b. The lead screw 255c is formed by direct processing on the rotation shaft 255b of the motor 255, or formed as a different part and then, fixed to the rotation shaft 255b by caulking or the like. In addition, the motor 255 has the first thrust bearing 255d which is formed at the shaft end on the opposite side to the output side of the rotation shaft 255b. The first thrust bearing 255d is a plate which stops movement of the rotation shaft 255b in a thrust direction. The second thrust bearing 256 is a screw or a pin which is engaged with the base 257 and mounted at the shaft end on the output side of the rotation shaft 255b. The second thrust bearing 256 is a plate which stops movement of the rotation shaft 255b in the thrust direction. The second thrust bearing 256 has a function which adjusts a position in the thrust direction, and accordingly, an amount of movement of the rotation shaft 255b in the thrust direction is adjusted. The base 257 is a case of the spherical aberration correction means 25, and is a member which fixes the motor case 255a and the second thrust bearing 256. The base 257 is required to reduce weight in consideration of impact resistance for the optical pickup 2, and therefore, resin is used. The present first embodiment is formed especially by resin which blocks electricity. This electrically insulates the first thrust bearing 255d from the second thrust bearing 256. This insulation is a function necessary for improving productivity with a manufacturing method to be described later. The stopper 258 is a member which restricts an amount of movement of the lens holder 252 or the screw mechanism 253 in the thrust direction.

Next, an operation of the spherical aberration correction element 25 will be described. The spherical aberration correction element 25 is driven by a motor 255. The motor 255 rotates the rotation shaft 255b by generating a torque around the rotation shaft 255b by electromagnetic action by flowing a current through coils formed inside the motor. The rotation of the rotation shaft 255b makes the lead screw 255c rotate, so that the screw mechanism 253, which performs linear motion along the groove of the lead screw 255c, moves in the thrust direction. The lens holder 252 conducts movement, constantly being abutted on the screw mechanism 253 by the preload means 254, and accordingly, the lens 251 is moved in the optical axis direction. The amount of movement of the lens holder 252 and the screw mechanism 253 in the thrust direction is restricted by the stoppers 258. When the lens holder 252 and the screw mechanism 253 abut on the stopper 258, the lens holder 252 and the screw mechanism 253 stop at a position as abutting on the stopper 258, however, the rotation shaft 255b receives a reaction force from the stopper 258 and starts to move in a reverse direction. The rotation shaft 255b moves till the rotation shaft 255b abuts on the first thrust bearing 255d or the second thrust bearing 256, after that, the rotation shaft 255b cannot move due to loss of synchronism of the motor 255 and stops.

Conventionally, the second thrust bearing 256 mounted at the shaft end on the output side of the rotation shaft 255b has not been provided with a position adjustment function, and an amount of movement to the output shaft end side of the rotation shaft 255b has not been controlled. Therefore, there has been a case where the motor rotor had abutted on the side surface in the motor case 255a and had stopped before the rotation shaft 255b has abutted on the second thrust bearing 256. As described above, when the motor rotor stops due to the contact in the motor, there arises a drawback that escapement in the reverse direction cannot be made because of a large contact resistance. Consequently, in the present first embodiment, a position adjustment function with respect to the thrust direction is provided at the second thrust bearing 256 which is provided at the shaft end on the output side of the rotation shaft 255b, and the position in the thrust direction of the second thrust bearing 256 is adjusted so as to abut on the second thrust bearing 256 before contact is made in the motor.

Next, a method of manufacturing the spherical aberration correction means 25 of the optical pickup 2 according to the first embodiment of the present invention will be described.

First, the motor 255 is mounted to the base 257a. Next, the screw mechanism 253 is engaged with the lead screw 255c of the motor 255. Engagement of the screw mechanism 253 can be implemented by rotating and pulling in the rotation shaft 255b. As for the rotation of the rotation shaft 255b, there are methods in which a current is flown through the motor 255 to drive and in which a groove fitting to the driver 259a is provided at the tip end of the rotation shaft 255b to rotate by the driver 259a. Next, the lens holder 252 is loaded with so as to abut on the screw mechanism 253, and the base 257b is fixed to the base 257a while exerting preload by the preload means 254. Since an aperture with which the second thrust bearing 256 is engaged is provided in the base 257b, the driver 259a is inserted through the aperture to rotate the rotation shaft 255b, and a position of the lens holder 252 can be readjusted. Next, the second thrust bearing 256 is mounted on the aperture provided in the base 257b using the assembly jig 259. The second thrust bearing 256 is assembled while adjusting an amount of movement of the rotation shaft 255b in the thrust direction. First, the second thrust bearing 256 is fastened in a direction of the motor case 255a by rotating the driver 259a. At this time, the electrical continuity checker 259b is provided between the driver 259a and the probe 259c abutted on the first thrust bearing 255d, and the fastening operation is performed till electrical continuity is confirmed by the electrical continuity checker 259b. After confirming the electrical continuity, the driver 259a is reversely rotated for a predetermined angle to loosen the second thrust bearing 256. After that, adhesive is applied to the second thrust bearing 256 by the bonding instrument 259d, to fix to the base 257b. As described above, the spherical aberration correction means 25 is manufactured, and accordingly, adjustment operation of the amount of movement of the rotation shaft 255b in the thrust direction can be efficiently implemented.

As described above, according to the present first embodiment, the amount of movement of the rotation shaft 255b in the thrust direction can be accurately controlled by the second thrust bearing 256. With this, when the lens holder 252 and the screw mechanism 253, which are stopped by abutting on the stopper 258, are driven in the reverse direction, operation can be surely performed. In addition, the adjustment operation of the second thrust bearing 256 can be easily implemented by the assembly jig 259 using the electrical continuity checker 259b, and therefore, operating efficiency is good and productivity is high. With these features, an optical pickup with high reliability and high productivity can be provided.

Second Embodiment

An optical pickup according to a second embodiment of the present invention will be described with reference to FIG. 4.

Figure 4:
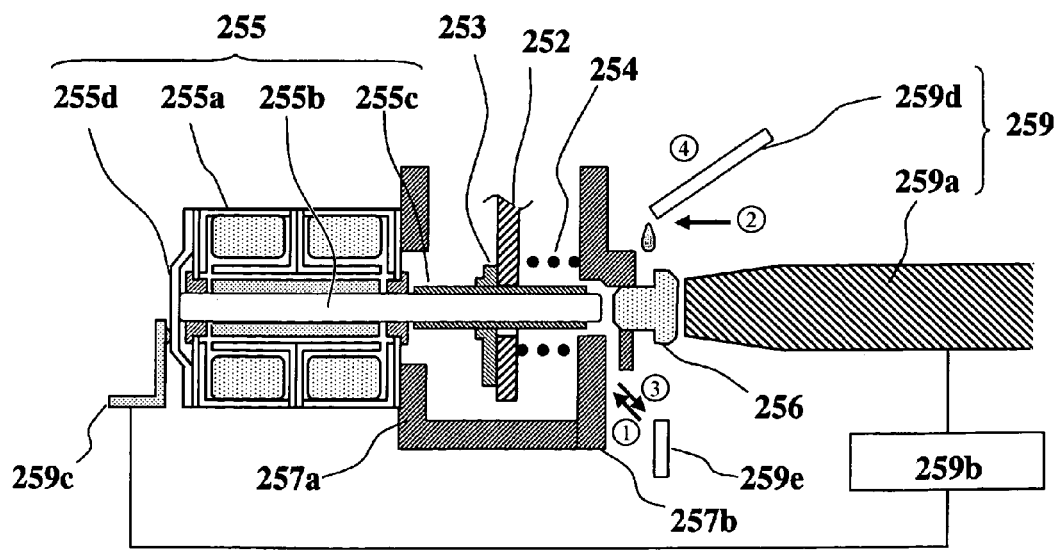
FIG. 4 is a view showing a method of manufacturing spherical aberration correction means of an optical pickup according to a second embodiment of the present invention.

FIG. 4 shows a configuration and a manufacturing method of spherical aberration correction means 25 mounted on an optical pickup 2 according to the second embodiment of the present invention.

In FIG. 4, reference numeral 259e denotes a spacer and other configuration is the same as FIG. 3.

In the present second embodiment of the present invention, an aperture which is for attaching and detaching a spacer is provided on a base 257b. The aperture is provided in a radial direction between a rotation shaft 255b and a first thrust bearing 255d, or between the rotation shaft 255b and a second thrust bearing 256. FIG. 4 shows a structure in which the aperture is provided on the second thrust bearing 256 side. The spacer 259e is a metal piece having a predetermined thickness and is sandwiched between the rotation shaft 255b and the second thrust bearing 256, and accordingly, a distance between the two is correctly controlled.

A method of manufacturing spherical aberration correction means 25 of an optical pickup 2 according to the second embodiment of the present invention will be described.

First, a motor 255 is mounted to a base 257a. Next, a screw mechanism 253 is engaged with a lead screw 255c of the motor 255. Engagement of the screw mechanism 253 can be implemented by rotating and pulling in the rotation shaft 255b. Next, a lens holder 252 is loaded with so as to abut on the screw mechanism 253, and the base 257b is fixed to the base 257a while exerting preload by preload means 254. Next, the spacer 259e is inserted through the aperture for attaching and detaching the spacer provided in the base 257b and is sandwiched between the rotation shaft 255b and the second thrust bearing 256. Next, the second thrust bearing 256 is mounted on the aperture provided in the base 257b using an assembly jig 259. The second thrust bearing 256 is assembled while adjusting an amount of movement of the rotation shaft 255b in a thrust direction. First, the second thrust bearing 256 is fastened in a direction of the motor case 255a by rotating the driver 259a. At this time, an electrical continuity checker 259b is provided between the driver 259a and a probe 259c abutted on the first thrust bearing 255d, and the fastening operation is performed till electrical continuity is confirmed by the electrical continuity checker 259b. After confirming the electrical continuity, removal operation of the spacer 259e is performed. After that, adhesive is applied to the second thrust bearing 256 by a bonding instrument 259d, to fix to the base 257b. As described above, the spherical aberration correction means 25 is manufactured, and accordingly, adjustment operation of the amount of movement of the rotation shaft 255b in the thrust direction can be efficiently implemented.

As described above, according to the present second embodiment, the amount of movement of the rotation shaft 255b in the thrust direction can be accurately controlled by the spacer 259e. With this, the adjustment operation of the second thrust bearing 256 can be easily implemented, and therefore, operating efficiency is good and productivity is high. With these features, an optical pickup with high productivity can be provided.

What is claimed is:

1. An optical pickup for use in an optical disk device, comprising:
    a motor having a rotation shaft;
    a first thrust bearing at one end of said motor rotation shaft;
    a second thrust bearing at the other end of said motor rotation shaft;
    a base for fixing a motor case of said motor;
    a lead screw fitted to said motor rotation shaft;
    a screw mechanism for converting rotation of said lead screw into linear motion;
    a lens holder to be moved in a thrust direction by said screw mechanism;
    a lens to be held by said lens holder; and
    preload means for exerting preload of the thrust direction on said lens holder,
    wherein said second thrust bearing can adjust a position in the thrust direction.

2. The optical pickup according to claim 1, wherein said first thrust bearing, said second thrust bearing, and said rotation shaft are composed of conductor.

3. A method of manufacturing an optical pickup according to claim 2, the method comprising the processes of:
    moving said second thrust bearing in a direction approaching to said rotation shaft till electrical continuity between said first thrust bearing and said second thrust bearing is obtained using an electrical continuity checker;
    subsequently moving said second thrust bearing in a direction departing from said rotation shaft; and
    subsequently fixing said second thrust bearing to said base.

4. The method of manufacturing an optical pickup according to claim 2, the method comprising the processes of:
    inserting a spacer made of conductor between said rotation shaft and said first thrust bearing, or between said rotation shaft and said second thrust bearing;
    moving said second thrust bearing in a direction approaching to said rotation shaft till electrical continuity between said first thrust bearing and said second thrust bearing is obtained using an electrical continuity checker;
    subsequently removing said spacer; and
    fixing said second thrust bearing to said base.

* * * * *